(12) United States Patent
Pan et al.

(10) Patent No.: US 6,950,316 B2
(45) Date of Patent: Sep. 27, 2005

(54) ELECTRONIC DEVICE WITH A SLIDABLE COVER MEMBER

(75) Inventors: Long-Jyh Pan, Hsi Chih (TW); Yung-Tsun Hsieh, Chang Hua Hsien (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 10/939,906

(22) Filed: Sep. 13, 2004

(65) Prior Publication Data

US 2005/0059443 A1 Mar. 17, 2005

(30) Foreign Application Priority Data

Sep. 16, 2003 (TW) .......................................... 92125488 A

(51) Int. Cl.⁷ .............................. H04B 1/03; H05K 5/02
(52) U.S. Cl. .................... 361/814; 361/752; 455/575.4; 455/90.3
(58) Field of Search .................................. 361/752–756, 361/814; 455/90.3, 575.1, 575.4, 347–348; 379/433.01

(56) References Cited

U.S. PATENT DOCUMENTS

| | | | | |
|---|---|---|---|---|
| 6,282,436 B1 | * | 8/2001 | Crisp ....................... | 455/575.4 |
| 6,728,558 B1 | * | 4/2004 | Kubo et al. .............. | 455/575.4 |
| 2003/0211874 A1 | * | 11/2003 | Mizuta et al. ........... | 455/575.4 |
| 2004/0198477 A1 | * | 10/2004 | Jung et al. ............... | 455/575.4 |
| 2005/0079902 A1 | * | 4/2005 | Chen et al. .............. | 455/575.4 |

* cited by examiner

Primary Examiner—Kamand Cuneo
Assistant Examiner—Tuan Dinh
(74) Attorney, Agent, or Firm—Ladas & Parry LLP

(57) ABSTRACT

An electronic device includes a main body, a slidable cover member disposed movably on the main body, and a magnetic member is sandwiched between the main body and the cover member to enable the user to move the cover member relative to the main body by a finger while gripping the main body in the palm of the user's hand.

10 Claims, 4 Drawing Sheets

ELECTRONIC DEVICE WITH A SLIDABLE COVER MEMBER

FIELD OF THE INVENTION

The invention relates to an electronic device, more particularly to an electronic device with a slidable cover member.

BACKGROUND OF THE INVENTION

An electronic device, such as a mobile phone or a personal digital assistant, has a plurality keys that is adapted to perform several tasks, such as noting down daily expenses, editing accounts, sending E-mail, playing songs, taking pictures in addition to receiving and replying calls.

Referring to FIG. 1, a conventional mobile phone 10 is shown to include a main body 11 and a slidable cover member 12. The main body 11 has a liquid crystal display 111 for showing the receiving and dialing telephone number or messages, and an operating panel 112 with a plurality of function keys. A receiver 113 is disposed on an upper portion of the main body 11 for receiving incoming voices. An audio transmitter 114 is disposed on a lower portion of the main body 11 for transmitting a message to an intended person.

The main body 11 further has two opposite side portions formed with two parallel grooves 13. Each of the parallel grooves 13 is defined by a groove-confining wall that has a bottom wall portion 130 formed with two opposite recesses 133 at opposite ends 131, 132 thereof.

The cover member 12 is mounted on the main body 11 to protect the function keys when the mobile phone 10 is not in use, and has two parallel rails 14 engaging slidably and respectively the parallel grooves 13 in the main body 11. Each of the parallel rails 14 has opposite first and second ends corresponding respectively to the first and second ends of the respective one of the parallel grooves 13. An engaging tongue 142 is fixed to the first end of a respective on of the parallel rails 14 for engaging the respective recesses 133. The cover member 12 is slidable on the main body 11 between a standby position, in which the function keys of the main body 11 are concealed underneath the cover member 12, and an operation position, in which, the function keys of the main body 11 is exposed to permit a user to operate the mobile phone 10.

One drawback resulting from the use of the aforesaid conventional mobile phone 10 resides in that the user must use both of his hands when he wishes to move the cover member 12 from the standby position to the operation position and vice versa. The user must apply a relatively large force on the cover member 12 with respect to the main body 11 in order to remove the engaging tongues 142 from the respective recesses 133. The situation is aggravated in case the mobile phone rings while the user is carrying some articles, the cover member 12 cannot be moved relative to the main body 11 by a single hand. In addition, the cover member 12 at the standby and operation positions is not stable due to lack of retaining members.

SUMMARY OF THE INVENTION

The object of the present invention is to provide a mobile phone having a main body and a slidable cover member that is movable manually with respect to the main body by a single hand so as to eliminate the drawback resulting from the use of the aforesaid conventional mobile phone.

Another object of the present invention is to provide a mobile phone having a cover member that is adapted to be retained stably and stationarily when moved to the standby and operation positions.

According to the present invention, an handheld electronic device is provided to include: a main body having two opposite side portions formed with two parallel guiding grooves, each of the parallel guiding grooves having opposite first and second ends; two first magnets attached respectively to the first and second ends of a respective one of the parallel guiding grooves; a cover member mounted on the main body, and having two parallel rails engaging slidably and respectively the parallel guiding grooves, each of the parallel rails having opposite first and second ends, the cover member being slidable on the main body between a standby position, in which an outer face of the main body is concealed underneath the cover member, and an operation position, in which, the outer face of the main body is exposed to permit a user to operate the handheld electronic device; and a second magnet attached to the first end of a respective one of the parallel rails. The first and second magnets are attractable to each other so that the cover member is retained stably and stationarily at the standby and operation positions by virtue of attraction between the first and second magnets and by virtue of alignment between the first and second magnets when the cover member is moved to the standby and operation positions.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTIONS OF THE PREFERRED EMBODIMENTS

Figure 1:
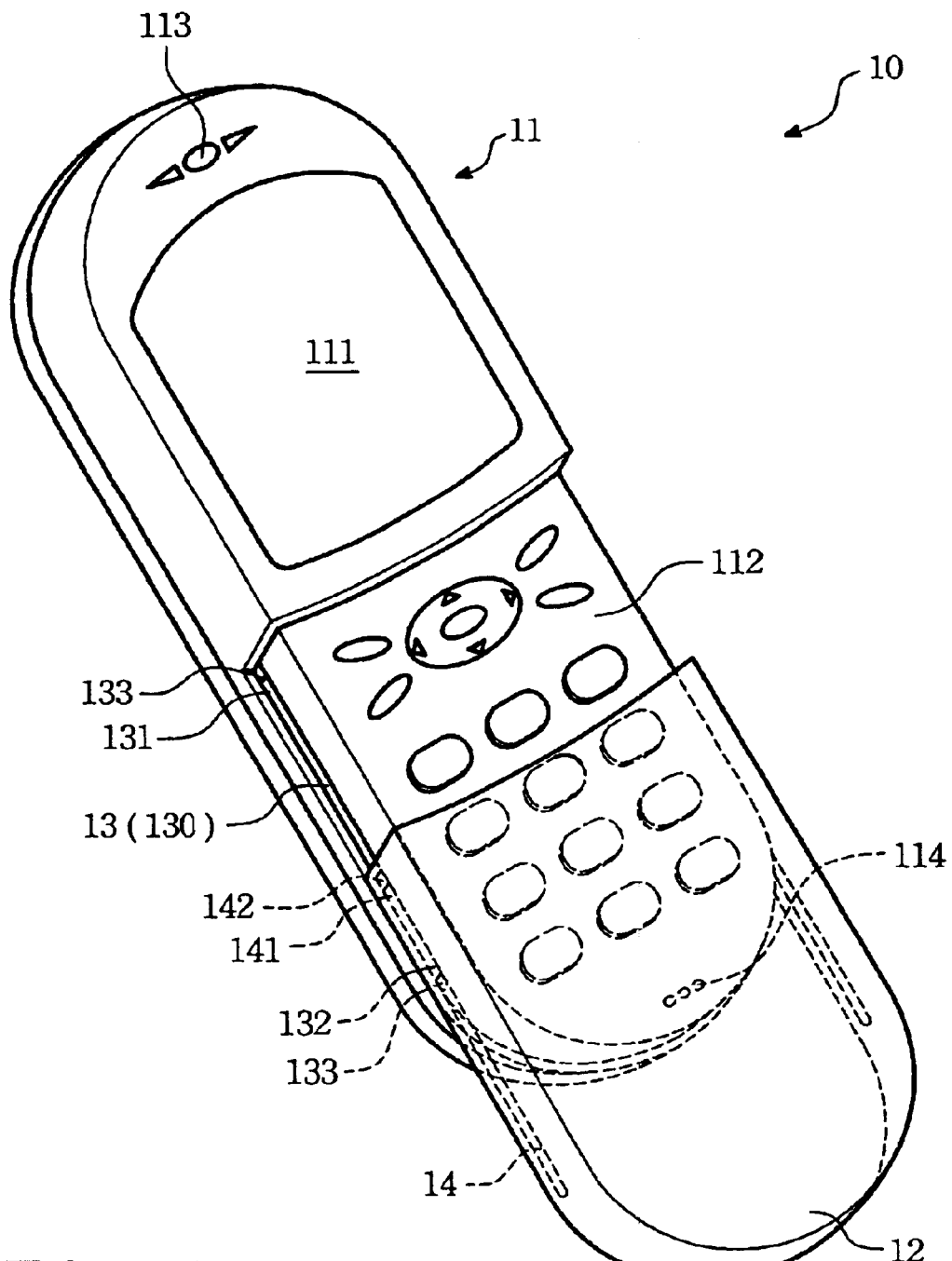
FIG. 1 shows a perspective view a conventional mobile phone.
Figure 2:
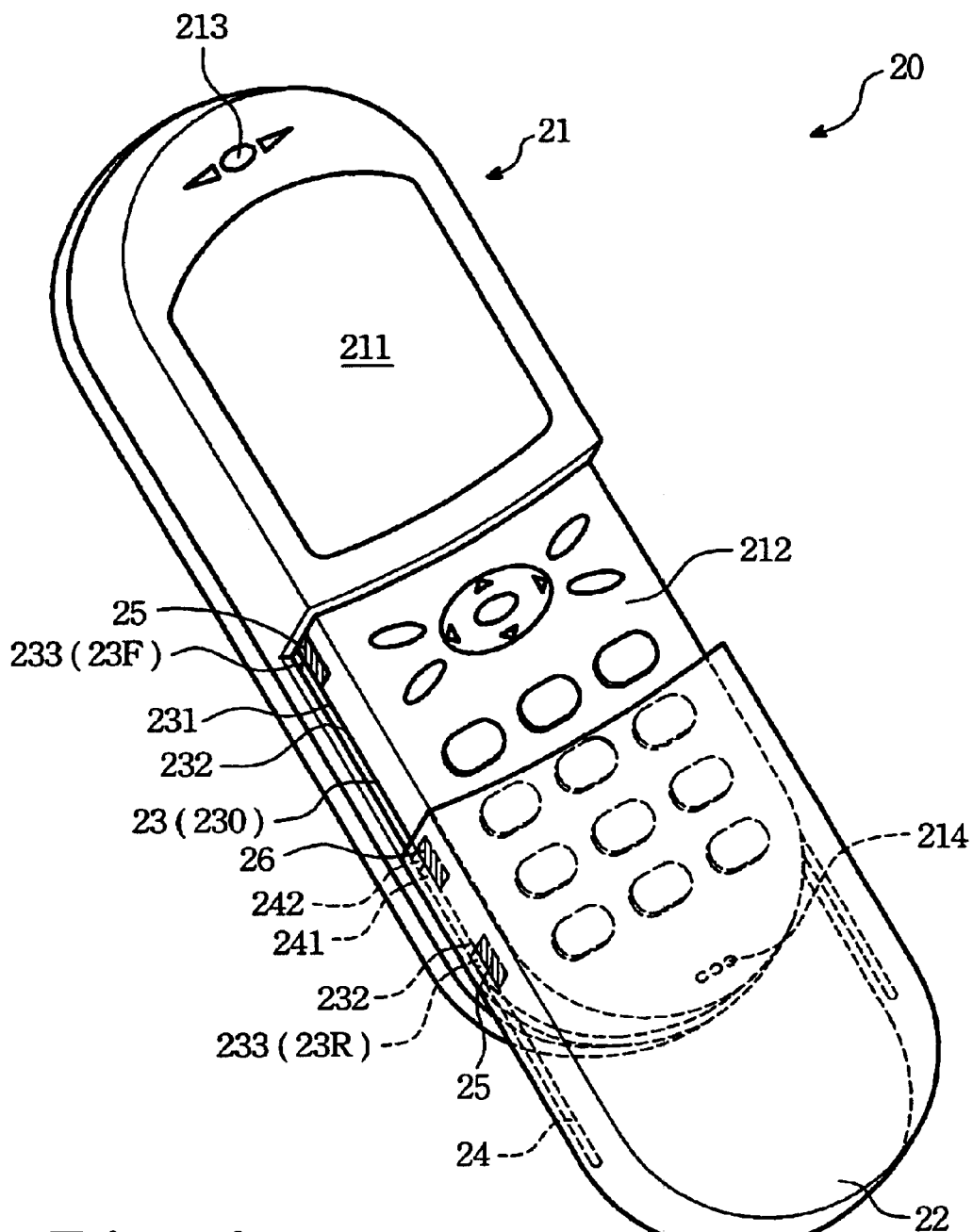
FIG. 2 is a perspective view of the preferred embodiment of a mobile phone according to the present invention.

Referring to FIG. 2, the preferred embodiment of a handheld electronic device (such as a mobile phone 20) according to the present invention is shown to include a main body 21, a cover member 22, two first magnetic units 25, and a second magnetic unit.

As illustrated, the main body 21 has two opposite side portions formed with two parallel guiding grooves 23. Each of the parallel guiding grooves 23 has opposite first and second ends 23F, 23R.

Figure 3A:
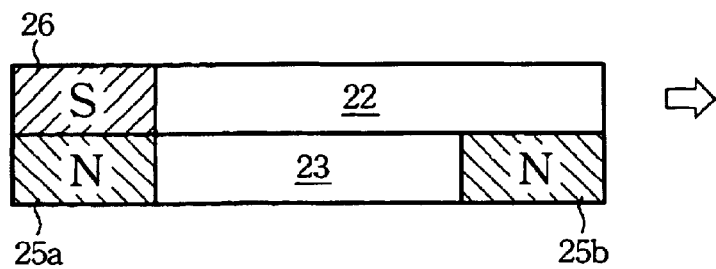
FIGS. 3A, 3B and 3C respectively illustrate positions of magnets mounted on/in sliding rails and parallel guiding grooves of the preferred embodiment of the mobile phone according to the present invention.

Each of the first magnetic units 25 includes two first magnets 25a, 25b (see FIG. 3A) attached respectively to the first and second ends 23F, 23R of each parallel groove 23 in the main body 21. The cover member 22 is mounted on the main body 21, and has two parallel rails 24 engaging slidably and respectively the parallel grooves 23 in the main body 21. Each of the parallel rails 24 has opposite first and second ends corresponding respectively to the first and second ends 23F, 23R of the respective parallel groove 23.

The cover member 22 is slidable on the main body 21 between a standby position, in which an outer face of the main body 21 is concealed underneath the cover member 22, and an operation position, in which, the outer face of the main body 21 is exposed to permit a user to operate the mobile phone 20.

Figure 3B:
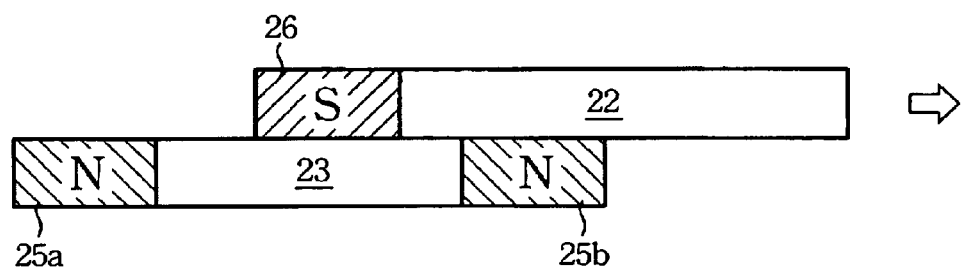
Figure 3C:
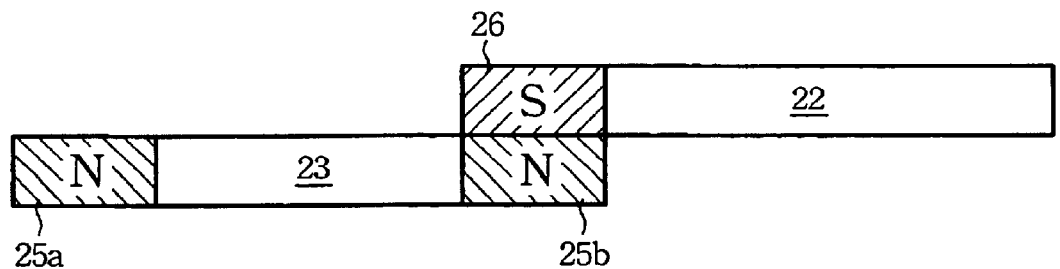

The second magnetic unit includes two second magnets 26 (only one is visible in FIG. 2) attached respectively to the first ends 241 of the parallel rails 24. In this embodiment, the first and second magnets (25a, 25b),26 are south and north poles and are attractable relative to each other so that when the cover member 22 is moved to the operation position, though the first ends 241 of the parallel rails 24 are offset respectively from the first ends 23F of the parallel grooves 23, the cover member 22 is retained stably and stationarily at the standby position (see FIG. 3C) by virtue of attraction and alignment between the first and second magnets 25b, 26. In the same manner, when the cover member 22 is moved from the operation position to the standby position (see FIG. 3A), the first ends 241 of the parallel rails 24 are registered respectively with the first ends 23F of the parallel grooves 23. The cover member 22 is therefore retained stationarily on the main body 21 by virtue of magnetic attraction and alignment between the first and second magnets 26, 25a (see FIG. 3A).

When the user wishes to move the cover member 22 from the standby position to the operation position (from FIGS. 3A to 3B), the user can exert a slight push on the cover member 22 by a finger, preferably a thumb, while gripping the main body 21 in the palm of the user's hand so as to result in movement of the second magnet 26 from the first magnet 25a to 25b by virtue of the magnetic attraction between the second magnets 26 of the cover member 22 and the first magnets 25b at the second ends 233 of the parallel grooves 23 in the main body 21.

A liquid crystal display 211 is mounted on the top portion of the outer face of the main body 21. Preferably, an operating panel 212 is mounted on the lower portion of the outer face of the main body 21. When the cover member 22 is moved to the standby position, the operating panel 212 is concealed underneath. Since the structure of the receiver 213 and the audio transmitter 214 is not relevant feature of the present invention, a detailed description thereof is omitted herein for the sake of brevity.

Referring again to FIG. 2, in this embodiment, each of the parallel grooves 23 is defined by groove-confining wall 230 that has a bottom wall section 231 and a peripheral wall section 232 extending from the bottom wall section 231. The bottom wall section 231 of each of the parallel grooves 23 is formed with two opposite recesses 233. The cover member 22 further includes an engaging tongue 242 fixed to the first end 241 of a respective one of the parallel rails 24 adjacent to the second magnet 26 for selectively engaging the respective recesses 233 in the main body 21.

Figure 5:
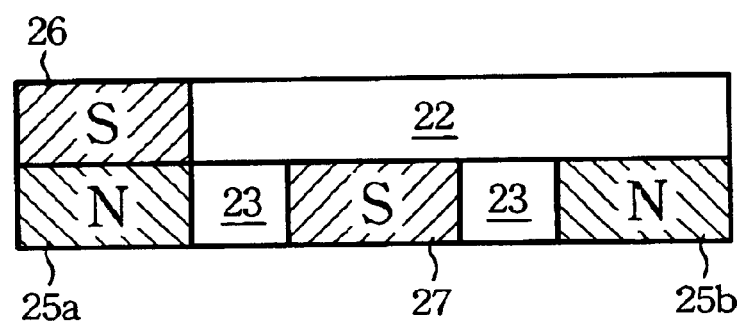
FIG. 5 illustrate positions of magnets mounted on/in sliding rails and parallel guiding grooves of another preferred embodiment of the mobile phone according to the present invention.

Referring to FIG. 5, another preferred embodiment of a mobile phone according to the present invention is shown. The only difference to the previous embodiment resides in that a third magnet 27 is disposed midway in each of the parallel grooves 23 between the first magnets 25a, 25b thereof. The third magnet 27 has the same pole as the second magnet 26 so as to result in an expelling force therebetween such that the cover member 22 can be retained more stationarily at the standby and operation positions by virtue of the aforesaid expelling force between the second and third magnets 26, 27.

Figure 4:
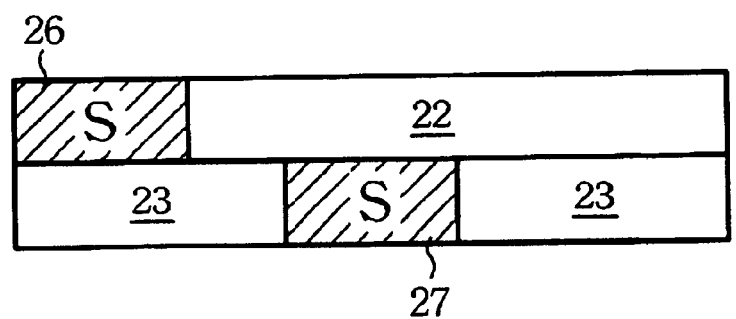
FIG. 4 illustrate positions of magnets mounted on/in sliding rails and parallel guiding grooves of a modified preferred embodiment of the mobile phone according to the present invention.

Referring to FIG. 4, still another preferred embodiment of the handheld electronic device is shown, wherein only two second magnets 26 and two third magnets 27 (only one is visible) are used. The second magnets 26 are attached respectively to the first ends 241 of the parallel rails 24 while the third magnets 27 are disposed respectively midway in the guiding grooves 23. Since the second and third magnets 26,27 have the same pole, an expelling force will be generated therebetween. Thus, the cover member 22 can be retained stationarily and stably when moved to the standby and operation positions.

Since manipulation of the cover member 22 of the mobile phone 20 according to the present invention can be conducted by the user's single hand, the object is thus achieved.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A handheld electronic device comprising:
    a main body having two opposite side portions formed with two parallel guiding grooves, each of said parallel guiding grooves having opposite first and second ends;
    two first magnets attached respectively to said first and second ends of a respective one of said parallel guiding grooves;
    a cover member mounted on said main body, and having two parallel rails engaging slidably and respectively said parallel grooves in said main body, each of said parallel rails having opposite first and second ends, said cover member being movable on said main body between a standby position, in which an outer surface of said main body is concealed underneath said cover member, and an operation position, in which said outer surface of said main body is exposed to permit a user to operate the handheld electronic device; and
    a second magnet attached to said first end of a respective one of said parallel rails;
    wherein, said first and second magnets are attractable relative to each other so that said cover member is retained stably and stationarily at said standby and operation positions by virtue of attraction between said first and second magnets and by virtue of alignment between said first and second magnets when said cover member is moved to said standby and operation positions.

2. The handheld electronic device according to claim 1, wherein said handheld electronic device is a mobile phone.

3. The handheld electronic device according to claim 1, further comprising a third magnet disposed between said first magnets and having the same pole as said second magnet so as to result in an expelling force between said second and third magnets when said cover member is disposed at said standby and operation positions, thereby further enhancing the stability of said cover member when said cover member is disposed at said standby and operation positions.

4. The handheld electronic device according to claim 2, further comprising an operating panel mounted on an outer face of said main body, said cover member concealing said operating panel when moved to said standby position.

5. The handheld electronic device according to claim 1, wherein each of said guiding groove is defined by a groove-confining wall having a bottom wall section and a peripheral wall section extending from said bottom wall section, said bottom wall section of each of said guiding grooves being formed with two opposite recesses, said cover member further including an engaging tongue fixed to said first end of said engaging rails for selectively engaging a respective one of said recesses in said main body.

6. The handheld electronic device according to claim 5, wherein said first magnets are respectively disposed in said recesses of a respective one of said parallel guiding grooves.

7. A handheld electronic device comprising:
a main body having two opposite side portions formed with guiding grooves, each of said guiding grooves having opposite first and second ends;
a first magnet disposed in one of said guiding grooves;
a cover member mounted on said main body, and having rails engaging said guiding grooves, and movable on said main body between a standby position, in which, said cover member conceals an outer surface of said main body underneath and an operation position, in which said outer surface of said main body is exposed to permit a user to operate the handheld electronic device; and
a second magnet disposed on said first end of one of said rails of said cover member; wherein, said first and second magnet are non-attractable relative to each other such so said cover member is retained stably and stationarily when moved said standby and operation positions by virtue of expelling force between said first and second magnets and by virtue of disposing said first and second magnets in a staggered manner.

8. The handheld electronic device according to claim 7, wherein said first magnet is disposed midway within said one of said guiding grooves.

9. The handheld electronic device according to claim 7, wherein said guiding groove is defined by a groove-confining wall having a bottom wall section and a peripheral wall section extending from said bottom wall section, said bottom wall section of each of said guiding grooves being formed with two opposite recesses, said cover member further including an engaging tongue fixed to said first end of said engaging rails for selectively engaging a respective one of said recesses in said main body.

10. The handheld electronic device according to claim 9, wherein said first magnet is disposed midway on said bottom wall section of a respective one of said guiding grooves.

* * * * *